Oct. 18, 1932. W. HAHNEMANN ET AL 1,882,819
DEVICE FOR THE QUICK CONTROL OF VOLTAGE IN DYNAMO ELECTRIC MACHINES
Filed Aug. 5, 1929 3 Sheets-Sheet 1

Inventors:
Walter Hahnemann
Robert Herzog
by
Attorney

*Inventors:*
*Walter Hahnemann*
*Robert Herzog*

*Attorney*

Oct. 18, 1932. W. HAHNEMANN ET AL 1,882,819
DEVICE FOR THE QUICK CONTROL OF VOLTAGE IN DYNAMO ELECTRIC MACHINES
Filed Aug. 5, 1929 3 Sheets-Sheet 3

Inventors:
Walter Hahnemann
Robert Herzog
by
Attorney

Patented Oct. 18, 1932

1,882,819

UNITED STATES PATENT OFFICE

WALTER HAHNEMANN, OF BERLIN-MARIENFELDE, AND ROBERT HERZOG, OF BERLIN, GERMANY, ASSIGNORS TO C. LORENZ AKTIENGESELLSCHAFT, OF BERLIN-TEMPELHOF, GERMANY

DEVICE FOR THE QUICK CONTROL OF VOLTAGE IN DYNAMO-ELECTRIC MACHINES

Application filed August 5, 1929, Serial No. 383,438, and in Germany August 11, 1928.

With devices employed for the control of the voltage in dynamo-electric machines there are two main types, one based on a rough control and the other one based upon a quick control. The former type possesses the advantage that they can be constructed both electrically and mechanically in a simpler way and require in general less efficiency in connections, but otherwise such machines have the drawback that the controlling device does not act at once at a change of voltage but only after a relatively large change has already taken place. This drawback is overcome by the quick control type, in which by means of relays a circuit is periodically closed and opened, which is decisive for the voltage to be controlled (mostly in the exciter circuit), causing an almost instantaneous adaptation to the new working conditions. The periodical interruption can be effected, for instance, by means of superposing an alternating current or by means of automatic interruption. In the examples referred to farther below, reference is had for the sake of simplicity to the first case.

In the accompanying drawings several modes of execution of the invention are illustrated by way of example.

The nature of the controlling operation of such a quick control is briefly explained with reference to Figure 1.

Figure 1:
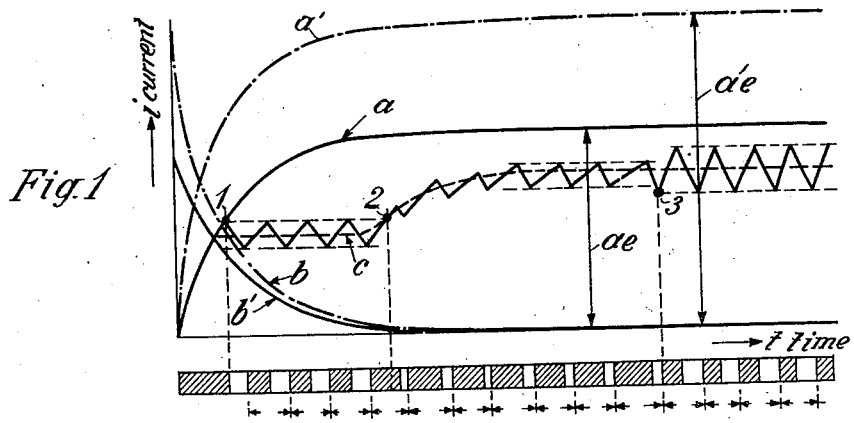
Figure 1 is an explanatory graph.

It is known that on closing a circuit the current or the field will not at once grow to its extent, but the current will temporarily increase according to a curve corresponding approximately to the curves $a$ and $a'$ respectively in Figure 1, whose path is dependent on the time constant of the controlling operation. In the same manner the disappearance of the current or field will take place about according to the curves $b$ and $b'$ respectively, which latter possess a reciprocal shape as compared with the curves mentioned first. Suppose for instance, the current has attained at a moment 1 on the curve $a$ $a$ a determined value, at which the generator has reached such a voltage, that the opening and closing periods of the periodically opened controlling contacts are of exactly the same value. As will be seen from the figure the exciter current will not obtain the end value $a_e$ or $a'_e$ respectively, which it would in the event of the contact being closed, but it will uniformly oscillate between two limiting values. If now a change occurs in the load of the machine or a change in speed, the voltage for instance will have a tendency to drop. This however will cause a change of the mean opening and closing period of the controlling contacts and in consequence of the exciting current, so that the decrease of the voltage through the increased mean exciting current of the generator, which will adapt itself almost instantaneously (for instance the moment 2 in Figure 1), will be compensated. At an increase of voltage the occurrence would take place in an inverse manner.

However, in this manner of quick control there is one difficulty. The controlling contact can deal with a limited output only, and exceeding this would even with medium sized machines lead to an extraordinarily quick burning of the material of the contacts. Besides, there will occur an oscillation of the voltage in an electrical respect at too large a controlling action.

The present invention shows a way to reduce the load of the contacts to the smallest possible degree and to avoid also the oscillations which will occur in the known arrangements having a wide range of control. This is effected in that through a servo-motor controlled automatically in dependency on the difference of the opening and closing period of the fine controlling contact, an additional regulating resistance situated in the circuit of the generator, is changed in such a manner, that on the one hand the effect of the fine control is ensured under all conditions of load, and that said control on the other hand will operate always at the most advantageous point within the range of control just available.

This invention will be more fully explained by way of the following examples.

Figure 2:
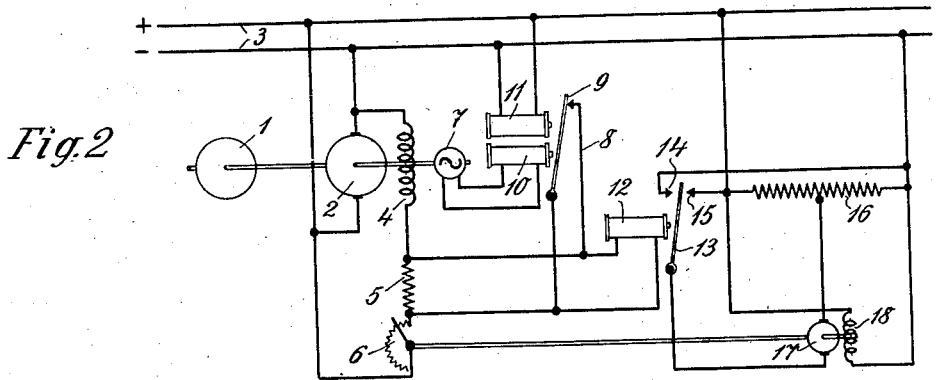
Figure 2 is a diagrammatic view showing one embodiment of the invention.

Figure 2 represents a simple example, wherein 1 designates any suitable driving motor or power engine, 2 a dynamo driven by the former with self excitation, 4 is the field winding, 5 and 6 are the resistances situated in the field circuit, and 3 is the network supplied by the dynamo 2, in this instance for continuous current. 8 and 9 are the quick controlling contacts, whose opening and closing is regulated by the relay windings 10 and 11. The winding 11 is connected to the constant voltage of the network, while the winding 10 is passed by an alternating current, whose frequency will determine the period of closing and opening of the contacts 8, 9. The alternating current may be taken from any suitable source. In the example under discussion, it is generated by means of a small auxiliary dynamo 7 which is mounted on the same shaft as the main machines. The contacts 8, 9 will short-circuit the resistance 5 periodically causing thereby a constant influencing of the field 4 and the instantaneous adaptation of the mean exciting current to the conditions of operation prevailing each time. In parallel with the resistance 5 is arranged the relay winding 12, which is likewise periodically energized and deenergized by the closing of the contacts 8, 9. The said relay 12 controls a changing contact 13 which oscillates between the contacts 14 and 15.

Suitably the dependency of said contact 13 on the controlling contacts 8 and 9 is so chosen, that where there is a uniformity of the opening and closing periods of the contacts 8, 9, the closing periods of the contacts 13, 14 too are exactly the same as those of the contacts 13, 15. The contact 13 leads to a pole of an armature of the auxiliary motor 17, while the other pole leads to the center of a resistance 16 connected to a source of E. M. F, (voltage of the network). The field 18 of the motor is likewise connected to said source and the ends of the resistance 16 lead to the contacts 14 and 15 respectively. If the contact 13 is in connection with 15, the motor will receive a torque in one direction, and if connected with 14 it will receive a torque in the opposite direction. On a quick change of the contact 13 between 14 and 15 a revolution of this motor in one direction or the other will occur only if the mean closing periods of the one or the other contact predominate. If this occurs, the auxiliary motor will change the value of an additional resistance 6 connected in series with the resistance 5 already referred to, and in consequence the range of control limited per se through the controlling contacts 8, 9 will be displaced in such a manner, that at every condition of operation the ratio of the opening and closing periods of the contacts 8, 9 are maintained constantly and consequently at always the most favorable point for controlling.

If for instance the dynamo is loaded heavily, normally the voltage of the machine would drop below the range of control of the quick control, and at the most through further control by hand the range of control could be displaced in this direction. According to the present invention this is done automatically by means of the servo-motor 17, which will control or adjust appropriately the primary current in the exciter circuit by altering the resistance 6, so that the oscillation of the exciter current or the field respectively will no longer take place according to the curves $a$ and $b$, but for instance according to the curves $a'$ and $b'$, (see Figure 1). The range of control of such a machine is practically unlimited and on the other hand the advantage of quick control is ensured under all conditions of work.

Figure 3:
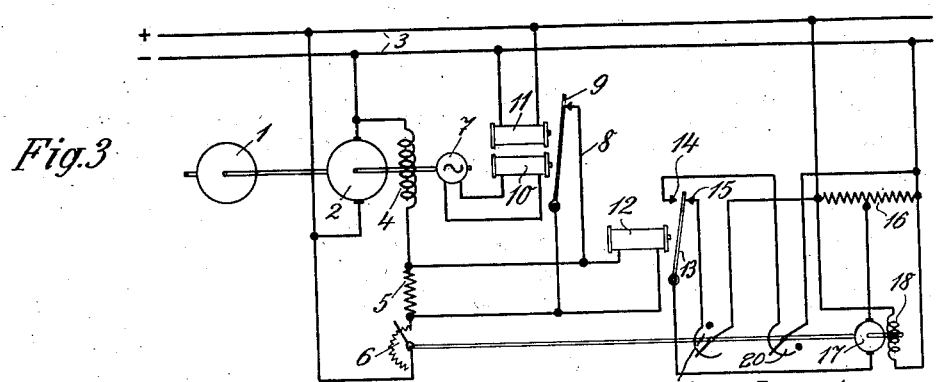
Figure 3 is a similar diagram showing another embodiment of the invention.
Figure 4:
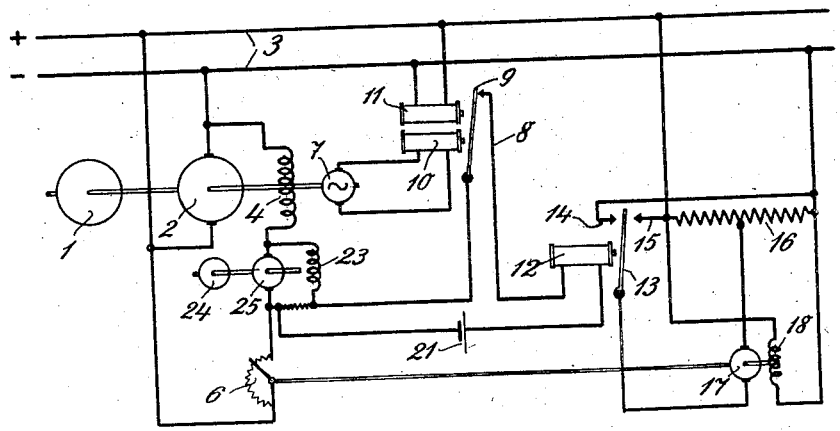
Figures 4 to 7 are views similar to Figures 1 and 2 showing further embodiments of the invention.

A similar example is represented in Figure 3, differing however in that for preventing an excessive run of the servo-motor mechanical stops or limiting contacts 19 and 20 are provided, which are arranged in the end position in one or the other direction and which will so render the servo-motor inoperative. These resistances, which are required only in exceptional cases will not cause the controlling device to become constantly inoperative, but at the removal of the exceptional condition (short circuit in the net and so on) and at the return of the voltage the motor and consequently the resistance 6 is automatically returned into its normal position through reversing the contact 13 to 14 or 15 respectively.

Additional examples of application are represented in Figures 4 to 7, in which the controlling device first of all acts on a circuit of small output, and which will control both the rough and the fine control. In the example represented in Figure 4 there is arranged in the field circuit of the dynamo to be controlled a small auxiliary dynamo 25 driven in any suitable manner (for instance through the motor 24), through the field current of this dynamo the contacts 8, 9 for quick control are influenced. The controlling contacts 8, 9 are connected in series with the relay winding 12, and besides there is cut into the controlling circuit an auxiliary battery 21, which supplies current for the relay 12 and prevents at the same time a deenergization of the auxiliary dynamo 25. For the rest the connection exactly corresponds to that shown in Figure 2. By this arrangement an additional decrease of the output to be interrupted by the controlling contacts is obtained.

Figure 5:
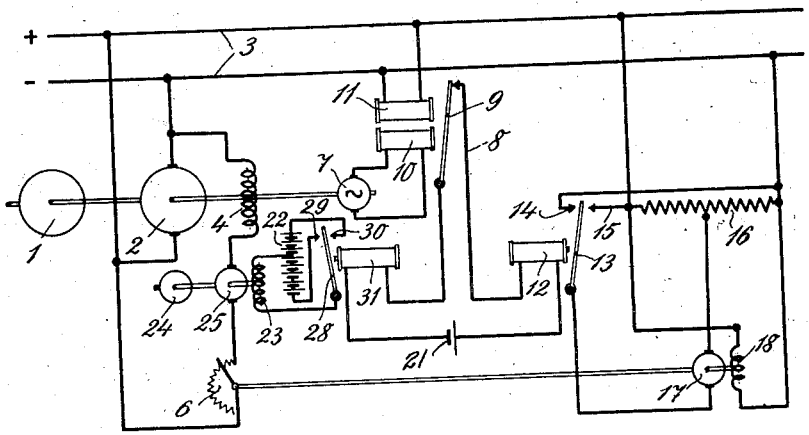
Figure 5:

The example according to Figure 5 shows a connection in which in the auxiliary dynamo situated in the exciting circuit of the machine to be controlled a reversible voltage is generated, by which an increase of sensitiveness of the operation of control is obtained. The exciter winding of the auxiliary dynamo is connected at its one pole to the center of a source of continuous current (battery 22), whose poles lead to the changing contacts 29 and 30. The other pole of the exciter winding is connected with the contact tongue 28, which is controlled by the relay 31.

On this relay act the quick controlling contacts 8, 9 dependent on the voltage to be controlled, and whose opening and closing will be transferred by way of the relay 31 to the armature switch 28 and consequently to the main exciting circuit. The current for the relay 31 is supplied by the battery 21, which serves also at the same time for the supply of the relay 12, which is likewise excited in step with the contacts 8, 9. The rough control is effected just as in the examples referred to above through the auxiliary motor 17, whose direction of motion is governed by the relay 12.

Figure 6:
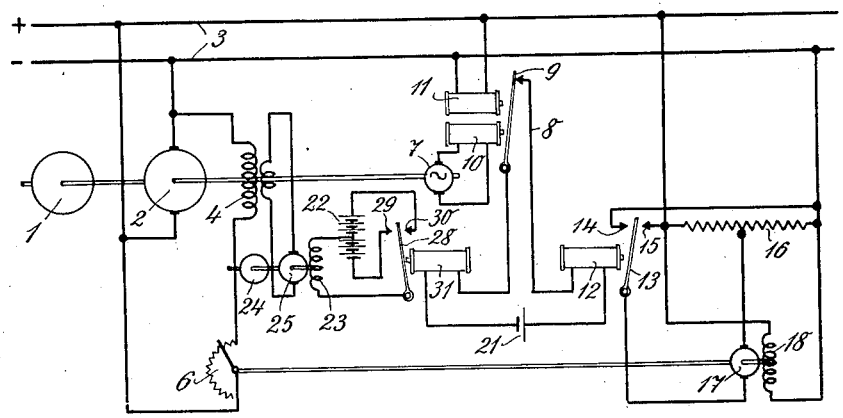
Figure 7:
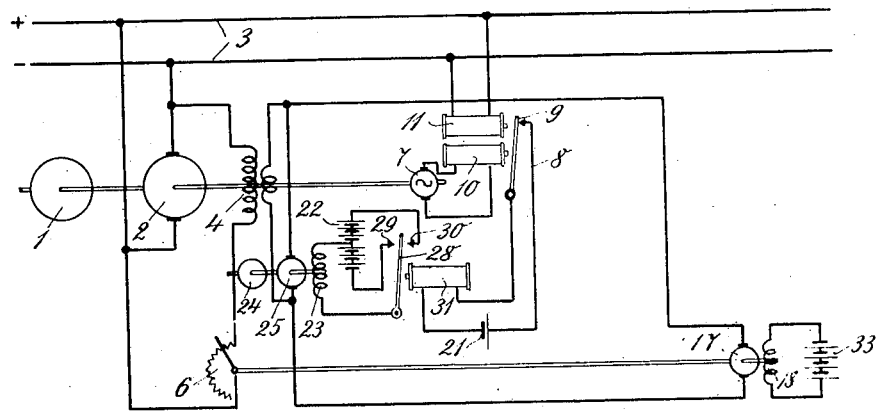

Instead of arranging the auxiliary dynamo 25 directly in the exciting circuit, it will be of advantage in many cases, as represented in Figure 6, to provide in the dynamo 2 proper special auxiliary windings or poles. This will prevent all the exciter current of the main field from flowing through the armature of the auxiliary dynamo, so that the exciting dynamo may be of substantially smaller dimensions.

By employing the auxiliary dynamo 25 for the purpose of generating a reversible voltage a considerable simplification of the whole arrangement may be obtained in that (according to Figure 7) the auxiliary motor 17 controlling the rough regulation is directly connected to the terminals of the auxiliary dynamo. So long as the voltage of the auxiliary dynamo possesses no marked continuous current component, the motor 17 will remain inoperative.

As soon as the mean opening and closing period of the contacts 8 and 9 changes, however, and in consequence an equal voltage is generated in the auxiliary dynamo in the one or the other direction, the controlling motor 17 will appropriately change the resistance 6 exactly as in the examples referred to above. The arrangement according to the invention, however, is of course not limited to the examples shown, but it can be transferred accordingly to all systems of quick control imaginable.

We claim:

1. A voltage regulating system for a dynamo-electric machine having a field winding comprising an electromagnetic device having a contact normally opened and closed periodically thereby and under the influence of the voltage of said machine, means controlled by the opening and closing of said contact for varying the exciting current through the field winding in timed relation thereto, a variable resistance in series with the field winding, and a motor controlled by said contact and controlling said resistance, the current through the armature of said motor being reversed periodically in timed relation to the opening and closing of said contact.

2. A voltage regulating system for a dynamo-electric machine having an exciting circuit comprising a regulator under the influence of the voltage of said machine and having a contact opened and closed periodically and continuously to increase and decrease within predetermined limits the current in the exciting circuit, a resistance in the exciting circuit, and means controlled by a difference in the opening and closing period of said contact for varying said resistance.

3. In a voltage regulating system for a dynamo-electric machine having an exciting circuit comprising a regulator under the influence of the voltage of said machine and having a contact opened and closed periodically and continuously, a fixed resistance in the exciting circuit periodically short-circuited by the opening and closing of said contact, a variable resistance in the exciting circuit, and means controlled by a difference in the opening and closing period of said contact for controlling said variable resistance.

4. A voltage regulating system for a dynamo-electric machine having an exciting circuit comprising a regulator under the influence of the voltage of said machine and having a contact opened and closed periodically and continuously to increase and decrease within predetermined limits the current in the exciting circuit, a variable resistance in the exciting circuit, a motor for controlling said variable resistance, a relay energized and de-energized by the opening and closing of said contact, and means controlled by said relay for reversing the direction of said motor.

5. A voltage regulating system for a dynamo-electric machine having an exciting circuit comprising a regulator under the influence of the voltage of said machine and having a contact opened and closed periodically and continuously, a fixed resistance in the exciting circuit periodically short-circuited by the closure of said contact, a variable resistance in the exciting circuit, a motor for controlling said variable resistance, and a relay connected in parallel to said fixed resistance and having a movable contact co-operating with front and back fixed contacts to control the direction of rotation of said motor.

6. A voltage regulating system for a dynamo-electric machine having an exciting circuit comprising a regulator under the influence of the voltage of said machine and having a contact opened and closed periodically and continuously, an auxiliary generator having a shunt field winding connected in the exciting circuit, a fixed resistance in series with the shunt field winding, a variable resistance in the exciting circuit, a motor for controlling said variable resistance, a relay whose winding is periodically connected in parallel with said fixed resistance by the closure of said contact, said relay having a pair of fixed contacts and a movable contact co-operating with first one and then the other of said fixed contacts and thereby controlling the direction of rotation of said motor.

7. A voltage regulating system for a dynamo-electric machine having an exciting circuit comprising a regulator under the influence of the voltage of said machine and having a contact opened and closed periodically and continuously, an auxiliary generator having a field winding, a coil in circuit with the armature of said generator and inductively related to the exciting circuit, a relay in circuit with said contact and having a pair of fixed contacts and a movable contact co-operating with first one and then the other of said fixed contacts to control the direction of current flow through said field winding, a variable resistance in the exciting circuit, a motor for controlling said variable resistance, a second relay periodically energized and de-energized under the control of the opening and closing of the regulator contact, said second relay having a pair of fixed contacts and a movable contact co-operating with first one and then the other of its fixed contacts and thereby controlling the direction of rotation of said motor.

8. A voltage regulating system for a dynamo-electric machine having an exciting circuit comprising a regulator under the influence of the voltage of said machine and having a contact opened and closed periodically and continuously, an auxiliary generator having a field winding, a coil in circuit with the armature of said generator and inductively related to the exciting circuit, a variable resistance in the exciting circuit, a motor for controlling said variable resistance, a relay in circuit with said contact and having a pair of fixed contacts and a movable contact co-operating with first one and then the other of said fixed contacts to control the direction of current flow through said field winding, and connections between said auxiliary generator and said motor whereby the co-operation of the movable contact with said fixed contacts controls the direction of rotation of said motor.

9. In an electrical system the combination with a supply circuit and a dynamo-electric machine provided with a field winding connected thereto, of regulating means for the machine comprising an electromagnetic mechanism under the influence of the current in the supply circuit and controlling a contact, a source of alternating current connected to and normally causing said mechanism to open and close said contact once during each cycle, means controlled by said contact for decreasing and increasing the effective resistance of the field winding in timed relation to the closing and opening of said contact, a variable resistance in series with the field winding, a motor for controlling said resistance and a relay operating in timed relation to the opening and closing of said contact and having contacts for reversing the direction of rotation of said motor.

In testimony whereof we have affixed our signatures.

WALTER HAHNEMANN.
ROBERT HERZOG.